United States Patent Office

3,120,512
ACYL DERIVATIVES OF 4-UREIDO-PENICILLANIC ACIDS AND PROCESS OF PREPARING THEM
Karl-Heinz Wallhäusser and Helmut Nahm, Frankfurt am Main, Germany, assignors to Farbwerke Hoechst Aktiengesellschaft vormals Meister Lucius & Brüning, Frankfurt am Main, Hochst, Germany, a company of Germany
No Drawing. Filed Mar. 17, 1961, Ser. No. 96,374
Claims priority, application Germany Mar. 19, 1960
13 Claims. (Cl. 260—239.1)

The present invention relates to compounds corresponding to the general formula

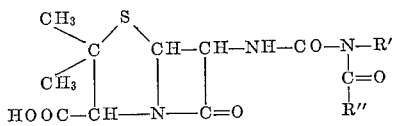

in which R' and R'' each represent a hydrogen atom, a saturated or unsaturated, straight chain or branched aliphatic radical containing 1 to 11 carbon atoms, the chain of which may be substituted by halogen atoms, hydroxyl and/or alkyl or cyano groups, or represent a cycloaliphatic radical containing the same substituents as those mentioned above, an aromatic or heterocyclic radical which may be substituted by halogen atoms, alkyl groups containing 1 to 4 carbon atoms, hydroxyl, alkoxy, alkylmercapto, acetylamino or propionylamino, alkyl ($C_1$–$C_4$)-amino, carboxy-alkyl and/or nitro groups, or represent an araliphatic radical which may be substituted by a chlorine or bromine atom or by the nitro group. R' and R'' may be identical or different.

The present invention likewise relates to a process of preparing the compounds corresponding to the above-mentioned general formula by reacting the 6-ureido-penicillanic acids, obtainable by reaction of 6-amino-penicillanic acid with isocyanic esters and corresponding to the general formula

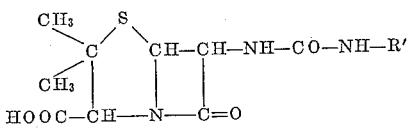

in which R' has the meaning given above, in a buffered solution with a chloride or bromide of a carboxylic acid or an acid anhydride of a carboxylic acid or a mixed acid anhydride and isolating in the form of an acid or its salts the compound thus formed.

By varying the combination of the radicals R' and R'' the range of microbiological activities as well as the resistance to acid of the new acyl-ureido-penicillanic acids may likewise be varied to a large extent.

The products of the invention may be used as such or in the form of galenic preparations such, for example, as jellies, powders, ointments, pastes, mixtures to be shaken, tinctures, solutions or suspensions, with the use of the usual non-toxic pharmaceutical organic or inorganic carriers. For making such galenic preparations there are used substances which do not react with the new compounds, for example, water, gelatin, bole, lactose, starch, magnesium stearate, talcum, vegetable oils, benzyl alcohol, gums, polyethylene glycol, cholesterol, vaseline, zinc oxide, titanium oxide, or other known carriers for medicaments. The corresponding galenic preparations or formulations may also contain auxiliary substances, such as stabilizers, buffer substances, wetting agents, emulsifiers, or salts that regulate the osmotic pressure.

The following examples serve to illustrate the invention but they are not intended to limit it thereto:

EXAMPLE 1

*Potassium Salt of N'-α-Phenoxy-Propionyl-N'-Benzyl-6-Uureido-Penicillanic Acid*

With vigorous shaking and cooling with ice 1.08 gram of 6-amino-penicillanic acid in 20 cc. of sodium-hydrogen-carbonate solution of 4% strength are dissolved while 3 cc. of diethyl ether are added. 0.85 gram of benzyl-isocyanate and 1 gram of sodium-hydrogen-carbonate are then added and the mixture is treated for a further 2½ hours under equal conditions. 1.15 gram of α-phenoxy-propionic acid chloride dissolved in 1 cc. of diethyl-ether is added. After 2½ hours the solution is filtered off with suction. The clear, alkaline filtrate is adjusted, while cooling, to pH 3 by means of phosphoric acid of 10% strength and immediately shaken out three times by means of 6 cc. of ethyl acetate each time. After drying by means of anhydrous magnesium sulfate an excessive amount of saturated methyl-alcoholic potassium acetate solution is added. The potassium salt separates at first in the form of a syrup. The excessive amount of solvent is evaporated in vacuo. With a small amount of ethyl-acetate the substance is again dissolved and the potassium salt of N'-α-phenoxy-propionyl-N'-benzyl-6-ureido-penicillanic acid is precipitated in crystalline form by means of anhydrous diethyl ether.

The yield amounts to 1.75 grams. The substance melts between 160 and 180° C. with decomposition.

*Analysis.*—536.6. Calculated: N=7.84; S=5.96%. Found: N=8.0%, 7.9%; S=5.8%, 5.8%.

In comparison to penicillin G the new substance is distinguished by a wide range of activities which extends to gram-negative microorganisms, and by its resistance to acids.

Range of microbiological activities: 1γ of the above-mentioned compound is placed on a paper filter disc of about 12 mm. diameter. By the streak test with the microorganisms mentioned below, the following inhibiting zones are determined (in mm.):

| Test germs | N'-benzyl-α-phenoxy-propionyl-6-ureido-penicillanic acid, 1γ | Penicillin G, 1γ |
|---|---|---|
| Staph. aureus P 209 | 16 | 18 |
| Staph. aureus R 85 (resistant to penicillin) | 7 | 0 |
| Staph. aureus 2438 (resistant to all commercial antibiotics) | 9 | 0 |
| E. coli | 11 | 0 |
| Mycobacterium 607 | 10 | 0 |

Resistance to acid: A solution of the new compound containing per 10 cc. of solution 1000γ of the substance, is adjusted to pH 2 by means of citric acid and preserved for 1 hour at 37° C. Samples are taken at intervals of 15 minutes and the activity is determined. Penicillin G (1000γ/10 cc.) is used as control solution under the same conditions. The evaluation is effected by a test on paper discs against Sarcina lutea, 0.01 cc. of the above-mentioned solution being placed on each disc. In the following table the diameter of the inhibiting zone is indicated in mm.:

| Evaluation after— | N'-benzyl-α-phenoxy-propionyl-6-uriedo-penicillanic acid | Penicillin G |
| --- | --- | --- |
| Immediately | 40 | 42 |
| 15 minutes | 40 | 30 |
| 30 minutes | 40 | 0 |
| 45 minutes | 39 | 0 |
| 60 minutes | 38 | 0 |

EXAMPLE 2

*Potassium Salt of N'-α-4-Chlorophenoxy-Propionyl-N'-Benzyl-6-Ureido-Penicillanic Acid*

The compound is prepared as described in Example 1 with the use of 1.08 gram of 6-amino-penicillanic acid, 0.85 gram of benzyl-isocyanate and 1.4 gram of α-(4-chlorophenoxy)-propionic acid chloride.

The yield amounts to 2.33 grams. The substance melts between 180 and 190° C. with decomposition.

EXAMPLE 3

*Potassium Salt of N'-2,4-Dichlorophenacetyl-N'-Benzyl-6-Ureido-Penicillanic Acid*

The compound is prepared as described in Example 1 by using 1.08 gram of 6-amino-penicillanic acid, 0.85 gram of benzyl-isocyanate and 1.4 gram of 2,4-dichlorophenacetic acid chloride. The yield amounts to 2.48 grams. The substance melts between 180 and 190° C. with decomposition.

EXAMPLE 4

*Potassium Salt of N'-Dichloracetyl-N'-Benzyl-6-Ureido-Penicillanic Acid*

The substance is prepared as described in Example 1 by using 1.08 gram of 6-amino-penicillanic acid, 0.85 gram of benzyl-isocyanate and 0.8 gram of dichloracetyl-chloride. The yield amounts to 2.15 grams. The substance melts between 160 and 180° C. with decomposition.

EXAMPLE 5

*Potassium Salt of N'-α-Phenoxy-Propionyl-N'-Undecyl-6-Ureido-Penicillanic Acid*

The substance is prepared as described in Example 1 by using 1.08 gram of 6-amino-penicillanic acid, 1.1 gram of undecyl-isocyanate and 1.0 gram of α-phenoxy-propionic acid chloride. The yield amounts to 3.8 grams. The substance melts between 150 and 160° C. with decomposition.

EXAMPLE 6

*N-Ethylpiperidine Salt of N'-n-Butyl-N'-Phenacetyl-6-Ureido-Penicillanic Acid*

To 0.6 gram of sodium bicarbonate in 60 cc. of water there are added at 0° C. 1.08 gram of 6-amino-penicillanic acid and a solution of 0.56 gram of n-butyl-isocyanate in 2 cc. of ether. The mixture is then stirred for 12 hours at 0° C. The resulting emulsion is extracted with 5 cc. of ether, the aqueous solution is separated. At 0° C. 0.34 gram of phenacetyl chloride dissolved in 15 cc. of ether is added to the aqueous solution and the mixture is stirred for a further 6 hours. 2 cc. of ether are then added to the solution, the aqueous part is separated, 2 cc. of ether are again added, and, with cooling, 2 N-phosphoric acid is added until no further turbidity can be observed in the aqueous layer. The organic phase is separated off, dried by means of sodium sulfate, filtered off and a small excessive amount of N-ethyl-piperidine is added. The precipitating salt is filtered off with suction, washed with ether and dried. The yield amounts to 0.9 gram of a colorless, finely crystalline powder, which decomposes in the range between 150 and 180° C. while foaming.

EXAMPLE 7

*N-Ethylpiperidine Salt of N'-Benzyl-N'-(2,4-Dinitro-α-Phenoxypropionyl)-6-Ureido-Penicillanic Acid*

The compound is prepared as described in Example 6 by using 1.08 gram of 6-amino-penicillanic acid, 0.85 gram of benzyl-isocyanate and 0.69 gram of 2,4-dinitro-α-phenoxy-propionyl-chloride. The yield amounts to 0.52 gram of a light yellow finely crystalline powder which decomposes between 125 and 130° C. with foaming.

EXAMPLE 8

*N-Ethylpiperidine Salt of N'-Benzyl-N'-α-Furoyl-6-Ureido-Penicillanic Acid*

The compound is prepared as described in Example 6 by using 1.08 gram of 6-amino-penicillanic acid, 0.85 of benzyl-isocyanate and 0.98 gram of α-furfuroyl-chloride. The yield amounts to 0.72 gram. The substance decomposes between 150 and 170° C.

EXAMPLE 9

*N-Ethylpiperidine Salt of N'-Benzyl-N'-Phenoxy-Acetyl-6-Ureido-Penicillanic Acid*

The compound is prepared as described in Example 6 while using 1.08 gram of 6-amino-penicillanic acid, 1.0 gram of benzyl-isocyanate and 1.71 grams of phenoxy-acetyl-chloride. The yield amounts to 1.18 gram. The substance decomposes between 170 and 180° C. with foaming.

EXAMPLE 10

*N-Ethylpiperidine Salt of N'-Cyclohexyl-N'-α-Phenoxy-Propionyl-6-Ureido-Penicillanic Acid*

The compound is prepared as described in Example 6 while using 1.08 gram of 6-amino-penicillanic acid, 0.94 gram of cyclohexyl-isocyanate and 0.48 gram of α-phenoxy-propionyl-chloride. The yield amounts to 0.33 gram. The substance decomposes between 130 and 160° C.

We claim:

1. The potassium salt of N'-α-phenoxy-propionyl-N'-benzyl-6-ureido-penicillanic acid.
2. The potassium salt of N'-α-4-chlorophenoxy-propionyl-N'-benzyl-6-ureido-penicillanic acid.
3. The potassium salt of N'-2,4-dichlorophenacetyl-N'-benzyl-6-ureido-penicillanic acid.
4. The potassium salt of N'-dichloroacetyl-N'-benzyl-6-ureido-penicillanic acid.
5. The potassium salt of N'-α-phenoxy-propionyl-N'-undecyl-6-ureido-penicillanic acid.
6. The N-ethylpiperidine salt of N'-n-butyl-N'-phenacetyl-6-ureido-penicillanic acid.
7. The N-ethylpiperidine salt of N'-benzyl-N'-(2,4-dinitro-α-phenoxy-propionyl)-6-ureido-penicillanic acid.
8. The N-ethylpiperidine salt of N'-benzyl-N'-α-furoyl-6-ureido-penicillanic acid.
9. The N-ethylpiperidine salt of N'-benzyl-N'-phenoxy-acetyl-6-ureido-penicillanic acid.
10. The N-ethylpiperidine salt of N'-cyclohexyl-N'-α-phenoxy-propionyl-6-ureido-penicillanic acid.
11. A member of the group consisting of 6-ureido-penicillanic acids of the formula wherein R' represents a member of the group consisting of alkyl of 1 to 11 carbon atoms, cyclohexyl and benzyl and R" represents a member of the group consisting of α-phenoxy-ethyl, α-chlorophenoxy-ethyl, α-nitrophenoxy-ethyl, phenoxy-methyl, chloro-methyl, benzyl, chlorobenzyl and furyl, and the physiologically tolerable salts thereof.

12. A process which comprises reacting 6-amino penicillanic acid with an isocyanate of the formula

R'NCO wherein R' represents a member of the group consisting of alkyl of 1 to 11 carbon atoms, cyclohexyl and benzyl, in an aqueous buffered solution at a temperature of about 0° C. and then reacting the resulting 6-ureido penicillanic acid, under substantially the same conditions, with a member of the group consisting of the chlorides, bromides and anhydrides of a carboxylic acid of the formula

R"COOH wherein R" represents a member of the group consisting of α-phenoxy-ethyl, α-chlorophenoxy-ethyl, α-nitrophenoxy-ethyl, phenoxy-methyl, chloro-methyl, benzyl, chlorobenzyl and furyl.

13. A process as defined in claim 12, wherein the final reaction product is isolated in the form of a physiologically tolerable salt.

References Cited in the file of this patent

UNITED STATES PATENTS 2,941,995    Doyle et al. _____ June 21, 1960

FOREIGN PATENTS 569,728    Belgium _____ Nov. 15, 1958

OTHER REFERENCES

Wertheim: Textbook of Organic Chemistry, pages 763–764 (1945), call No. QD 251 W48.

Morton: The Chemistry of Heterocyclic Compounds, page VI of the preface, call No. QD 400 M65.